United States Patent
Östman et al.

(10) Patent No.: US 6,697,347 B2
(45) Date of Patent: Feb. 24, 2004

(54) METHOD AND APPARATUS FOR CONTROLLING TRANSMISSION OF PACKETS IN A WIRELESS COMMUNICATION SYSTEM

(75) Inventors: Kjell Östman, Halikko (FI); Esa Malkamäki, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 172 days.

(21) Appl. No.: 09/935,212

(22) Filed: Aug. 22, 2001

(65) Prior Publication Data

US 2003/0039230 A1 Feb. 27, 2003

(51) Int. Cl.[7] .............................................. H04B 7/216
(52) U.S. Cl. ...................................... 370/335; 370/342
(58) Field of Search ............................... 370/329, 335, 370/341, 342, 333, 349, 431, 441, 468

(56) References Cited

U.S. PATENT DOCUMENTS

| | | | |
|---|---|---|---|
| 6,163,524 A | 12/2000 | Magnusson et al. | 370/208 |
| 2001/0005378 A1 * | 6/2001 | Lee | 370/459 |
| 2001/0043576 A1 * | 11/2001 | Terry | 370/328 |
| 2002/0160782 A1 * | 10/2002 | Joshi et al. | 455/452 |

OTHER PUBLICATIONS

3rd Generation Partnership Project; Technical Specification Group Radio Access Network; High Speed Downlink Packet Access: Overall UTRAN Description (Release 5), 3GPP TR 25.855 V0.0.8, Jun. 2001, Valbonne, France.

* cited by examiner

*Primary Examiner*—Ajit Patel
(74) *Attorney, Agent, or Firm*—Ware, Fressola, Van Der Sluys & Adolphson LLP

(57) ABSTRACT

A system in which a packet-sending entity and a packet-receiving entity communicate using a plurality of parameter signaling channels (SCCH) and also using a plurality of shared data channels (SDCH) and do so according to a protocol in which when packet data are transmitted over one or more transmission time intervals (TTIs), the communication being such that once a parameter signaling channel is assigned to the packet-receiving entity for communicating a packet, the assigned channel is used in each subsequent TTT as long as there is at least a portion of the packet in the subsequent TTI. When there is, the packet-receiving entity despreads and decodes only one parameter signaling channel for the subsequent TTI along with the data channels. When there is not, the packet-receiving entity despreads all the parameter signaling channels for the subsequent TTI, and may decode some or all of the parameter signaling channels.

31 Claims, 5 Drawing Sheets

METHOD AND APPARATUS FOR CONTROLLING TRANSMISSION OF PACKETS IN A WIRELESS COMMUNICATION SYSTEM

FIELD OF THE INVENTION

The present invention relates to wireless communication, such as provided by systems as specified in 3GPP (Third Generation Partnership Project) Wideband Code Division Multiple Access (WCDMA) release 5, High Speed Downlink Packet Access (HSDPA), but also as provided by other kinds of wireless communications systems providing for packet transmission. More particularly, the present invention relates to the paging of mobile stations communicating with a base station in such communication systems.

BACKGROUND OF THE INVENTION

FIG. 1 illustrates a radio frame that includes a number of complex (in-phase and quadrature) chips divided among fifteen slots. The radio frame may have a duration of ten milliseconds (10 ms) and include 38400 chips. In the Third Generation Partnership Project (3GPP) each such frame is called a Transmission Time Interval (TTI) defining the periodicity at which Transport Block Sets are transferred to the physical layer on the radio interface. Each slot thus includes 2560 chips, which may represent, for example, ten 256-chip symbols (with an SF of 256). Such a frame/slot/chip structure is a feature of the 3GPP, wideband CDMA communication system currently under consideration. The radio signal transmitted by a BS in such a communication system is the sum of spread and scrambled data and control bits and an unscrambled synchronization channel. Data and control bits are typically spread by either bit-wise (in DS-CDMA systems) or block-wise replacement by an orthogonal sequence or sequences, such as Walsh-Hadamard sequences. (This is sometimes called m-ary orthogonal keying.) As noted above, the spread results are then scrambled usually by bit-wise modulo-2 addition of a pseudo-noise (PN) scrambling sequence.

It will be appreciated that the data bits include user information, such as audio, video, and text information, and that the information of different users is made distinguishable, in accordance with CDMA principles, by using distinguishable spreading sequences, such as mutually orthogonal Walsh-Hadamard sequences. In a sense, then, each user's Walsh-Hadamard sequence(s) define that user's communication channel, and thus these distinguishable sequences are said to channelize the user information. The construction of sequences according to their correlation properties is described in U.S. Pat. No. 5,353,352 to P. Dent et al for Multiple Access Coding for Radio Communications and U.S. Pat. No. 5,550,809 to G. Bottomley et al for Multiple Access Coding Using Bent Sequences for Mobile Radio Communications.

It is desirable to provide various types of communication services to meet various consumer demands, such as voice telephony, facsimile, e-mail, video, Internet access, etc. Moreover, it is expected that users may wish to access different types of services at the same time. For example, a video conference between two users would involve both voice and video support. Some services require higher data rates than others, and some services would benefit from a data rate that can vary during the communication.

FIG. 2 depicts a typical tree structure for Walsh-Hadamard sequences, or codes. Levels in the code tree define channelization codes of different lengths, corresponding to different spreading factors. In FIG. 2, the root of the tree is indicated by code $C_{1,1}$ that has a spreading factor SF=1, level 1 of the tree includes codes $C_{2,1}$ and $C_{2,2}$ that each have spreading factors of 2, and so forth. At each level, exemplary corresponding sequences, or codes, are indicated. For the root level, the example shown is [1], for level 1, the example codes shown are [1 1] and [1 −1], and so forth. In the notation $C_{k,i}$ illustrated, k is the spreading factor SF and the index i simply distinguishes codes at the same level. It will be appreciated that the tree continues to branch as one moves to the right in FIG. 2 and that it is not necessary for the code sequence at the root level to have only one element as illustrated.

All codes in a code tree cannot be used simultaneously in the same cell or other environment susceptible to mutual interference because all codes are not mutually orthogonal; a code can be used if and only if no other code on the path from the specific code to the root of the tree or in the sub-tree below the specific code is used. This means that the number of available channelization codes is not fixed but depends on the rate and spreading factor of each channel in the group of channels that potentially can mutually interfere.

Eligible channelization codes can be allocated randomly from the available eligible codes in the code tree structure for channels of different rates and spreading factors, which is to say that the eligible codes may be allocated without co-ordination between different connections, other than maintaining orthogonality. On the uplink, different users (connections) use different scrambling codes, so all of the spreading codes in a tree can be used for each user without co-ordination among different users. The situation on the downlink could be different because the BS typically uses only one scrambling code for all users (connections). Thus, spreading codes cannot be allocated so freely; co-ordination among users is needed.

In WCDMA based systems high speed data transmission may be enabled, e.g., by means of the so called high speed downlink packet access (HSDPA) technology. The high speed downlink packet access (HSDPA) may include functions such as fast hybrid automatic repeat request (HARQ), adaptive coding and modulation (AMC) and/or fast cell selection (FCS). These functions are known by the skilled person and will thus not be explained in more detail. A more detailed description of these and other function of the HSPDA can be found, e.g., from a third generation partnership project technical report No. 3G TR25.848 release 2000 titled 'Physical Layer Aspects of UTRA High Speed Downlink Packet Access'. It shall be appreciated that although the HSDPA has been specified for use in the WCDMA, similar basic principles may be applied to other access techniques.

At the present it is assumed that in the high speed downlink packet access (HSDPA) each user equipment receiving data on a high speed downlink shared channel (HS-DSCH) also has an associated dedicated channel (DCH) allocated. The dedicated channel may be mapped to a dedicated physical channel (DPCH) in the physical layer. The DPCH is typically divided into dedicated physical data channel (DPDCH) and dedicated physical control channel (DPCCH) both in the uplink and the downlink. Data such as the power control commands, transport format information, and dedicated pilot symbols are transmitted on the DPCCH. Information such as diversity feedback information may also be transmitted on DPCCH in the uplink. The HS-DSCH may be mapped to one or several high speed physical downlink shared channels (HS-PDSCH) in the physical layer.

The associated dedicated channel is typically provided both in the downlink and the uplink. The dedicated channel is typically used to carry HSDPA related information/signaling as well as other dedicated data such as speech and control data. The user equipment may communicate with several base stations at the same time. For example, the associated dedicated channel may be in soft handover.

In addition to associated dedicated channels, the HS-DSCH may be associated also with a shared control channel (SCCH). The SCCH can be used to carry HS-DSCH specific information/signaling to those users receiving data on the HS-DSCH.

A current proposal is to use the dedicated channel to inform the user equipment that it has data to be read on the HS-DSCH and SCCH. That is, only those users receiving data at a given time will receive an indication on the dedicated channel. The dedicated channel may be called as a pointer channel since it points to the shared channels. The dedicated channel may also contain information about modulation and coding schemes, power levels and similar parameters used for the shared channels. This information can be sent also on the shared channel. The shared control channel on the other hand is used to carry information that is specific to the data transmitted on the shared data channel (HS-DSCH). This information can contain for instance packet numbers for the HARQ and so on. The shared control channel can be sent on a separate code channel (code multiplexed) or using the same code channels as HS-PDSCH (time multiplexed).

Unlike the dedicated channel, the HS-DSCH is assumed not to be in soft handover. That is, each base station is assumed to have their own shared channel and the user equipment is assumed to receive data from only one base station at a time. The so called fast cell selection (FCS) technique may be used to switch the data transmission from one base station to another. However, the shared channels does not use power control. Instead, the shared channels are proposed to be transmitted with fixed or semi-fixed power. The term 'semi-fixed' means in here that the power is not changed often. The power could, for instance, be a cell specific parameter.

In the currently proposed arrangements the high speed downlink shared channel (HS-DSCH) is planned to be associated with a dedicated channel which would carry in the downlink at least information regarding the timing when the receiving station is to receive on a shared channel. The associated dedicated channel may possibly carry also other information. In the uplink, the associated dedicated channel may carry, for example, the required acknowledgements (ACK) for a fast HARQ.

The Transmission Time Interval (TTI) for HSDPA will be shorter than for Rel'99 WCDMA. TTI lengths of 1, 3, 5 and 15 slots have been proposed, corresponding to 0.67 ms, 2 ms, 3.33 ms and 10 ms, respectively. Currently, 3 slots, i.e., 2 ms, TTI is most probable choice and is considered as preferred solution in this text.

The Problem Addressed by the Invention

In a packet access system, such as HSDPA, a user typically accesses the communication link (channel) and media only when the user has data to transmit or receive. In order to effectively utilize the communication link, several users usually share the same link.

So that each user knows when there is data to be received and so knows to access the communication link, in some systems a link master notifies the user that a data packet is about to be transmitted. Hence, in such systems, each user must more or less continuously listen to a packet paging channel.

Since a communication link can be statistically multiplexed between a large number of users, there would also be a multitude of packet paging channels required, one for each user. In order to make the number of paging channels as large as possible (i.e. in order to maximize the number of available codes and code channels), a spreading factor for the paging channel is used in some systems, and the spreading factor is made as high as possible so as to allow as many users as possible to use the same part of a code tree.

A high spreading factor for a paging channel implies a very low bit rate in the channel. On the other hand, a highly flexible and adaptive system, such as the proposed HSDPA, might require that a multitude of parameters be transmitted to a mobile station along with each packet.

For this reason, the prior art has proposed that another set of code channels, different from the paging channel, be used for parameter signaling. (When using another set of code channels for parameter signaling, the paging channel can also be called either a paging indicator channel or a pointer channel, since it either indicates that there is data to be received on the parameter signaling channel, or it points to a certain parameter signaling channel.) The number of such code channels should be the same as the number of code multiplexed users for any particular transmission interval. Since this number usually is much smaller than the number of active users, the prior art has proposed that the parameter signaling channels be shared among the active users. See for instance Chapter 6.3.2.1.2. (Two-step signaling approach) of 3GPP TR 25.855 v1.1.0.

As mentioned above, in HSDPA, a fixed spreading factor is used for the data code channels and at this time has a value of 16. Hence, there are at most sixteen full-speed data code channels available. At least one of the channels, i.e. one of the branches of the code tree, must be allocated for the common pilot channel (CPICH) used for instance for channel estimation in the mobile station and other common channels as well as for the dedicated (packet paging) channels and parameter signaling channels (also called shared control channels). The remaining fifteen code branches are, according to the prior art, temporarily allocated either to one user, or they are allocated to at most fifteen separate users. In the former case, one parameter signaling channel is needed; and in the latter case, fifteen parameter signaling channels are needed. Typically, the shared data channel is assumed to be shared within a given TTI by a number of users, which are code multiplexed. In FIG. 3, an example is shown with four shared control channels. In either case, there can be more than fifteen active users that share the data channels (via time division multiple access).

According to the prior art, each active mobile station decodes its own paging channel. When there is a transmission for a particular mobile station, the paging channel for the mobile station so indicates. In addition, the paging channel for the mobile station indicates the code (parameter signaling) channel where the parameters for the transmission interval are signaled. The mobile station then decodes the assigned parameter signaling channel, which enables the mobile station to then decode the actual data transmission.

The main problem with the above protocol is that if the paging channel content, parameter signaling channel content, and data channel(s) content are sent in sequence, then three frames or transmission time intervals (TTIs) are needed to complete one data transmission. The prior art therefore also provides that all of the content of all three different channels be sent simultaneously, i.e. in a single TTI.

If all of the content of all three different channels is sent simultaneously, the mobile station must buffer all channels that may have to be decoded, i.e. all the parameter signaling code channels and all the data channels; in the worst case for HSDPA, this amounts to a total of thirty separate channels. To provide a large enough buffer in the mobile station to handle thirty channels would be difficult and expensive. As an alternative to providing the buffer in the mobile station, the prior art also provides that the channels be despread and then buffered, rather than buffered on the chip level (i.e. before being despread, so that the channels are buffered with the spreading code, which requires more memory). Such an alternative requires less memory, but requires a larger number of despreaders.

What is needed, is a way to send to a mobile station the content of the three kinds of channels (the paging channel, the parameter signaling channel, and the data channel) without requiring as many despreaders as in the three-channel-at-a-time prior art, and without requiring three TTIs as in the one-channel-at-a-time prior art.

SUMMARY OF THE INVENTION

Accordingly, the present invention provides a packet-sending entity, such as a base station, and a packet-receiving entity, such as a mobile station, methods by which the packet-sending entity and packet receiving entity function so as to have the packet sending entity communicate a packet to the packet-receiving entity, and a corresponding system including both the packet-sending entity and the packet-receiving entity, the methods for use in a context in which the packet-sending entity and packet-receiving entity communicate via a packet communication system using a plurality of parameter signaling channels (SCCH), and also using a plurality of shared data channels (SDCH) and operating according to a protocol in which when packet data is to be transmitted from the packet-sending entity to the packet-receiving entity, the communication between the packet-sending entity and the packet-receiving entity occurs over one or more transmission time intervals (TTIs). The methods are such that once a parameter signaling channel is assigned to the packet-receiving entity for communicating a packet, the assigned parameter signaling channel is used by the packet-receiving entity in each subsequent TTI as long as there is at least a portion of the packet in the subsequent TTI, and when there is at least a portion of the packet in the subsequent TTI, for the subsequent TTI the packet-receiving entity despreads and decodes only one parameter signaling channel along with the data channels, and when there is not at least a portion of the packet in the subsequent TTI, for the subsequent TTI the packet-receiving entity despreads all the parameter signaling channels, and decodes either all, one, or none of the parameter signaling channels.

In a first aspect of the invention, a method is provided for operation of the packet-sending entity, the method including: a parameter transmitting step, having the packet-sending entity transmit to the packet-receiving entity at least some of the parameters for decoding some or all of the shared data channels using at least one of the parameter signaling channels; a data providing step, having the packet-sending entity provide to the packet-receiving entity the data to be communicated using at least one of the shared data channels according to the parameters provided on the at least one parameter signaling channel; and a further parameter transmitting step, having the packet-sending entity continue to use the same at least one parameter signaling channel to transmit parameters for decoding any additional data transmitted on at least one of the shared data channels for the same packet-receiving entity in the subsequent consecutive TTIs.

In a further aspect of the first aspect of the invention, in the parameter transmitting step, the packet-sending entity transmits to the packet-receiving entity within a TTI at least some of the parameters for decoding some or all of the shared data channels within the next TTI. In a still further aspect, in the data providing step, the packet-sending entity provides to the packet-receiving entity in the TTI immediately following the TTI in which the parameter signaling channel is transmitted the data to be communicated using at least one of the shared data channels according to the parameters provided on the at least one parameter signaling channel.

In a second aspect of the invention, a method is provided for operation of the packet-receiving entity, the method including the steps of: until the packet-sending entity assigns a parameter signaling channel to the packet-receiving entity, having the packet-receiving entity despread all the parameter signaling channels and decode a predetermined subset of the parameter signaling channels, wherein the predetermined subset of the parameter signaling channels is either all, one, or none of the parameter signaling channels; once a parameter signaling channel is first assigned to the packet-receiving entity, having the packet-receiving entity interpret the assignment to be an assignment of a parameter signaling channel for the current TTI, and having the packet-receiving entity despread and decode the assigned parameter signaling channel in the current TTI so as to obtain parameter data from the parameter signaling channel; having the packet-receiving entity use the parameter data in reading the content of the shared data channels in the subsequent TTI; having the packet-receiving entity monitor information communicated by the packet-sending entity so as to determine whether the next TTI includes at least a portion of the packet; in each TTI until the TTI prior to the last TTI in which a portion of the packet is transmitted over the data channels, having the packet-receiving entity despread only the assigned parameter signaling channel and also decode the assigned parameter signaling channel; and for the last TTI in which a portion of the packet is transmitted over the shared data channels, having the packet-receiving entity despread only the assigned parameter signaling channel and also buffer the assigned parameter signaling channel.

Thus, the invention provides a method and an arrangement to page a mobile station, a method and arrangement that minimizes the complexity of the mobile and maximizes the processing time of the base station if hybrid automatic repeat request (HARQ) is employed.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention will now be described in an application to a communication system implementing hybrid automatic repeat request (H-ARQ) with high-speed downlink packet access (HSDPA), as set out in 3GPP (Third Generation Partnership Project) Wideband Code Division Multiple Access (WCDMA) release 5, HSDPA. The invention, however, should be understood to be of use in wireless communication systems whether or not HARQ is used. The invention offers the advantage of not requiring three transmission time intervals (TTIs), which is especially beneficial in the case of systems using HARQ.

The Invention

The invention provides a protocol that amounts to a compromise between the two above-described approaches of the prior art, namely the three-channel-at-a-time approach and the one-channel-at-a-time approach. With the invention, the transmission of the beginning of a data packet to a particular mobile station is staggered (partitioned) into two successive transmission intervals, instead of one or three, as in the prior art.

According to the invention, while waiting for a packet transmission, a mobile station buffers all the parameter signaling channels and decodes the paging channel assigned to the mobile station. At this stage, the mobile station must buffer up to fifteen channels, but most likely far fewer. As in the prior art, when the paging channel assigned to the mobile station indicates that a packet is to be transmitted, it also indicates which parameter signaling channel will be used.

According to the invention and unlike as in the prior art, once a parameter signaling channel is first conveyed to a mobile station, that same parameter signaling channel (meaning the same channelization code) is used in all further consecutive transmission time intervals in which data is sent to the mobile station (i.e. data belonging to the same packet transmission burst). Hence, at this stage, according to the invention, the mobile station may have to buffer fifteen data channels, but need not buffer extra parameter signaling channels, since the same parameter signaling channel is used throughout a continuous data transmission for one user, such as for example in FIG. 4, the data being provided the SDCH in columns 2–4.

With the present invention, the code despreading (number of rake fingers) is optimized: when there is no data being transmitted to a mobile station, all 'data' fingers are free and can be used to despread shared control channels. When the data channel (or part of it) is allocated to a mobile station, the mobile station is so informed during the previous TTI on one of the shared control channels. If more data are to be sent to the same mobile station in the next TTIs, then the parameters will be sent using the same shared control channel as for the first transmission. Thus, when receiving data on a shared data channel, the mobile station only needs to despread (and decode) one shared control channel.

Figure 1:
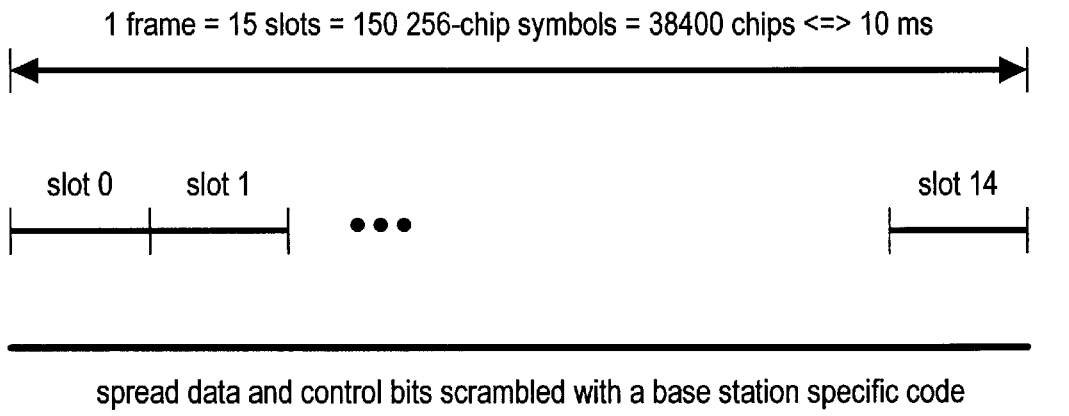
FIG. 1 is a schematic illustrating a radio frame comprising CDMA chips divided among fifteen slots, according to the prior art.
Figure 2:
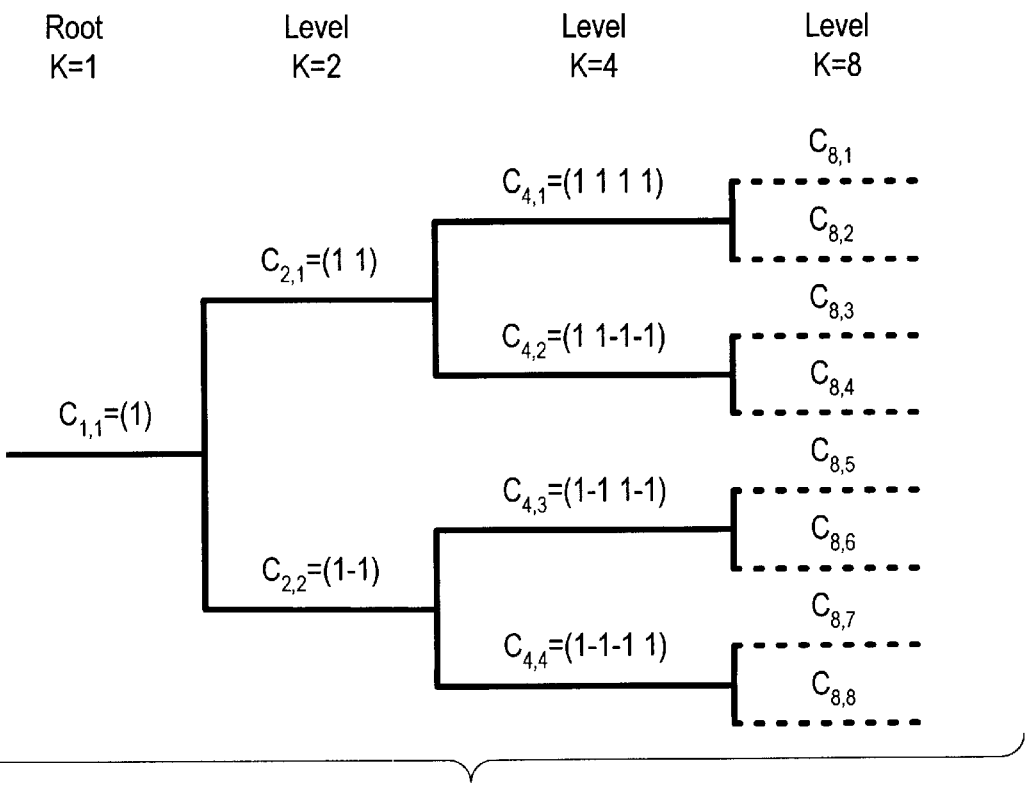
FIG. 2 is a schematic illustrating a code tree that defines channelization codes of length k, according to the prior art.
Figure 3:
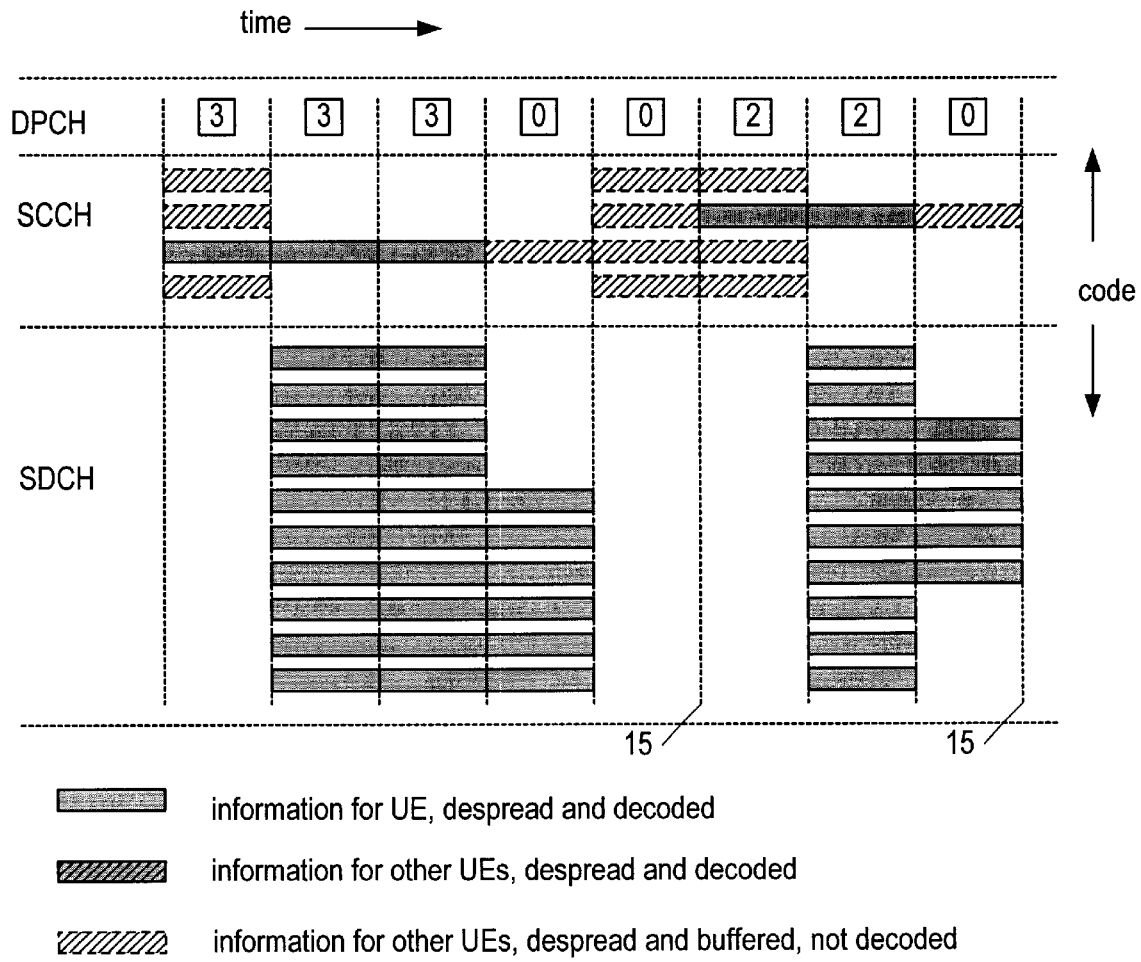
FIG. 3 is a schematic illustrating paging of a mobile station (otherwise known as user equipment, or mobile station), according to one embodiment of the invention.

Referring now to FIG. 3, which illustrates the invention for use with a communication system implementing HSDPA, the dedicated physical channel DPCH is used as the paging channel. In the illustration of FIG. 3, there are four shared control code channels SCCHs used as the parameter signaling channels, and ten shared data code channels SDCHs used as the shared data channels. TTI boundaries 15 are indicated by vertical dashed lines extending from the row for the DPCH through all of the rows for the SDCH. The DPCH for different TTIs, called here DPCH slots, are shown conveying numbers that are either 0, 1, 2, 3 or 4, serving as channel indicators (indicating a particular SCCH). The non-zero numbers shown are a subset of the set of shared code channel SCCH numbers 1–4, which indicate the SCCH number to be used by the mobile station for the current TTI. A value of 0 in a DPCH slot indicates that there is no data for the mobile station in the next TTI and therefore no parameter info on any of the shared control channels in the current TTI. A block with a dashed outline means that the mobile station despreads and buffers the code channel (shared control channel) received but need not decode (read) it. A block with a solid outline means that the mobile station despreads and decodes (reads) the code channel. (All blocks shown in gray with a solid border are blocks that the mobile station must despread and decode. The blocks with slash lines are blocks not intended for the mobile station, i.e., a gray block with a solid border and slash lines is a block not intended for the mobile station but which the mobile station has to despread and decode, while a white block with a dashed border and slashed lines is a block not intended for the mobile station, but one which the mobile station has to despread and buffer anyway. TTIs having no frames could be used for other mobile stations.)

(Note that it is possible to switch the order of spreading and scrambling and the corresponding despreading and descrambling. However, in the transmitter the encoding must be performed prior to spreading and scrambling, and in the receiver, decoding must be performed last.)

Thus, as indicated in FIG. 3, according to the invention, in those TTIs during which the mobile station does not receive data on a shared data channel SDCH, the mobile station despreads and buffers all (or a predefined set of) the shared code channels SCCH.

When the mobile station is allocated a shared control channel SCCH (in order to receive data in the next TTI with the correct parameters), the network will, according to the invention, only use that same SCCH in all of the next consecutive TTIs during which the data (the continuation of a packet burst) is to be subsequently conveyed, so that the mobile station need only despread and decode one SCCH when despreading and decoding data on the SDCH(s). When the data transmission is complete (for a packet burst), the mobile station again despreads all the SCCHs until it is again allocated a SCCH (which may be different from the earlier allocated SCCH); the mobile station uses the newly allocated SCCH not only for the current TTI, but for all subsequent, consecutive TTIs during which the data is transmitted. As illustrated in FIG. 3, according to the invention, data channels are despread only when there is data to receive, and all control channels are received only when there is no simultaneous data.

Figure 4:
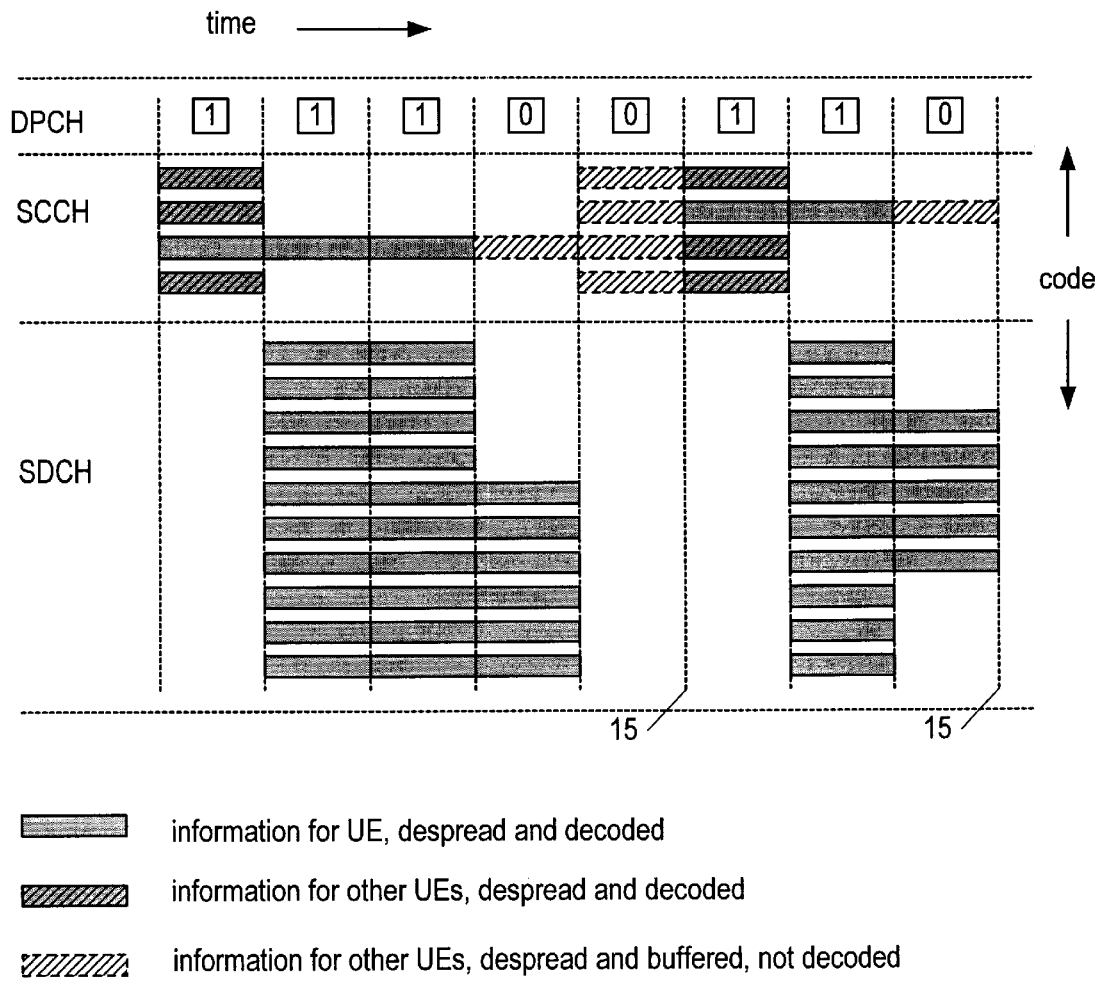
FIG. 4 is a schematic illustrating paging of a mobile station, according to another embodiment of the invention.
Figure 5:
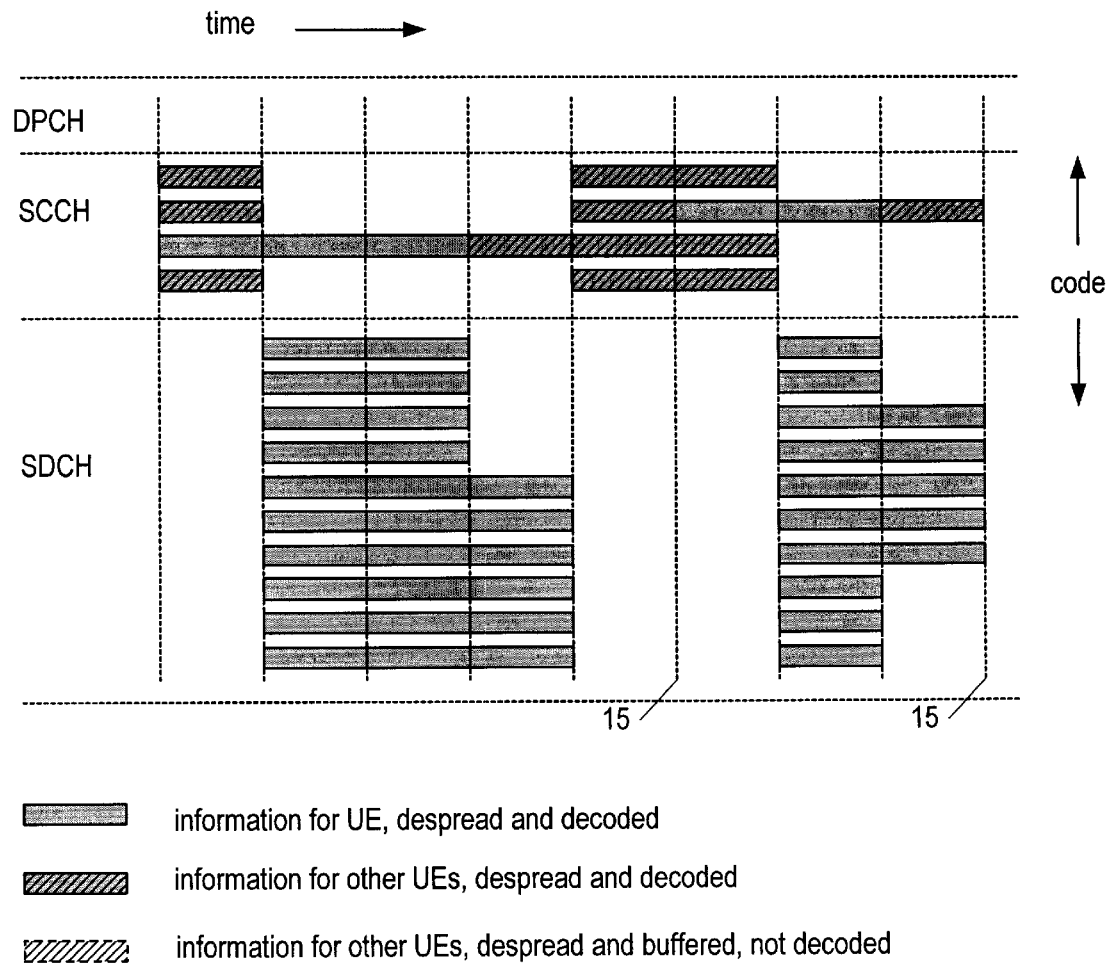
FIG. 5 is a schematic illustrating paging of a mobile station, according to yet another embodiment of the invention.
Figure 6:
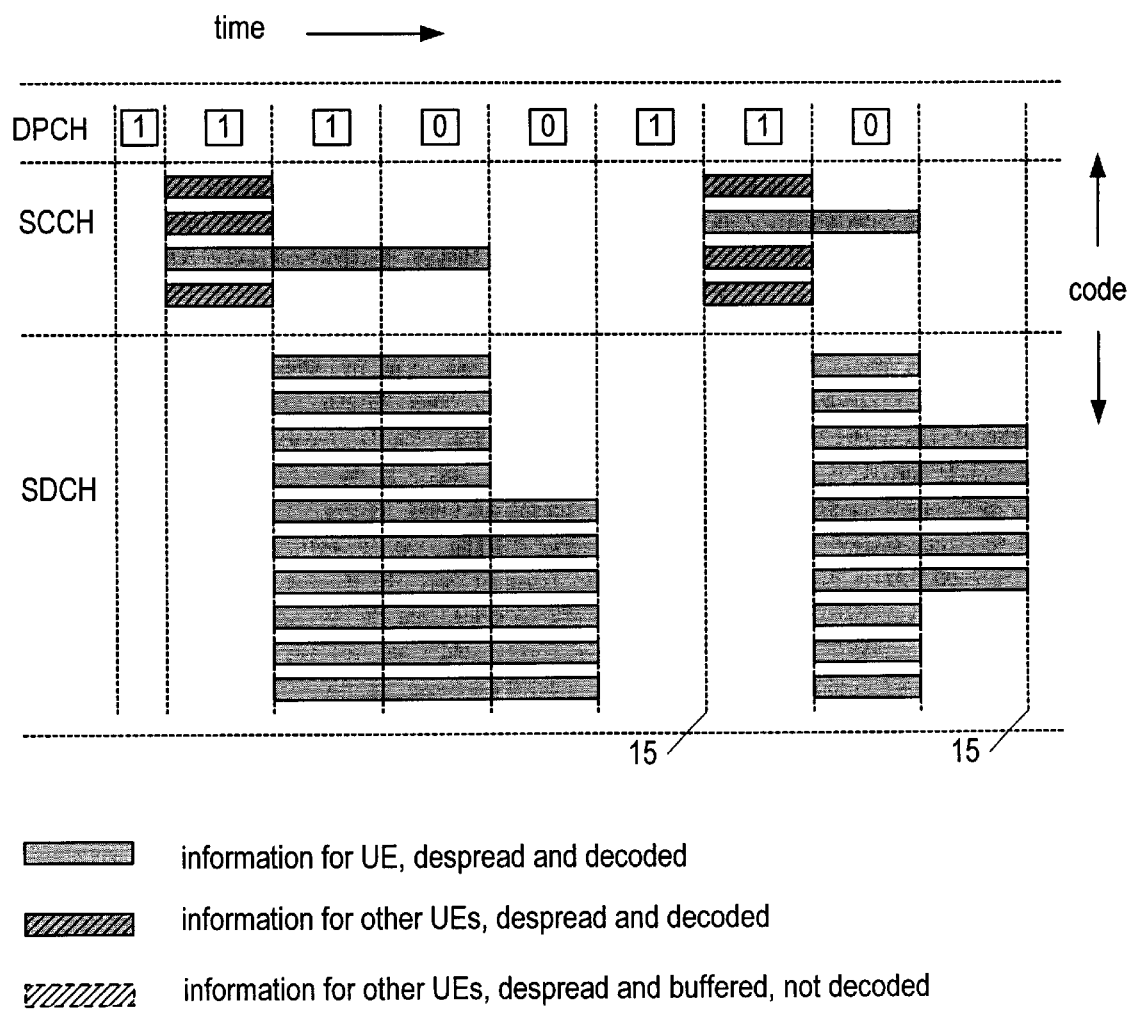
FIG. 6 is a schematic illustrating paging of a mobile station, according to yet even another embodiment of the invention.

FIGS. 4–6 show two other arrangements for the DPCH and SCCHs according to the invention. Referring now to FIG. 4, the DPCH is assumed to convey a single bit indicator, i.e. either a 0 or a 1. (It is understood by persons skilled in the art that to convey a bit of information in practice may require transmitting several physical bits over the air, i.e., the bit may be repeated or otherwise protected using known channel coding techniques.) The bit indicator indicates whether the mobile station is going to receive data in the next TTI and therefore whether the mobile station must read (decode) the shared control channels to get the parameter information. The mobile station must decode all of (or a predefined subset of) the SCCHs to find out on which SCCH the parameter information for it is transmitted. To convey to the mobile station which SCCH to use, one or another identifier of the mobile station can be sent on the SCCH the mobile station is to use; alternatively, the CRC (cyclic redundancy check) can be mobile station specific (i.e. so that other mobile stations would get a decoding failure when trying to decode the SCCH). In subsequent TTIs, the same SCCH is used as in the previous case, i.e. only one SCCH must be despread and decoded simultaneously with the received data channels. When DPCH indicates with a 0 for the bit indicator that there is no data for the mobile station in the next TTI, then the SCCH(s) in the current TTI is (are) not decoded but must be despread and buffered, as indicated in FIG. 4. For the first TTI in which the binary indicator turns from a one to a zero, only the assigned SCCH is despread, and then it is buffered, not decoded (the mobile station knowing from the binary indicator that the SCCH does not contain parameter information for it in the current TTI).

Referring now to FIG. 5, in another arrangement according to the invention, the DPCH does not convey a bit indicator (as in FIG. 4) or a channel indicator (as in FIG. 3); in some implementations, a DPCH is not used at all. Therefore, the mobile station, when not receiving data, must despread and decode all (or a predefined set of) the SCCHs to find out whether one of them is intended for it. Again, the SCCH must either convey expressly a mobile station identifier or indicate the mobile station indirectly, such as by using a mobile station specific CRC, as explained above in connection with FIG. 4. Once the mobile station finds control information for it on one of the SCCHS, it reads the parameters and receives data in the next TTIs according to the parameters. In subsequent consecutive TTIs, the control information is sent on the same SCCH, and the mobile station need only read one SCCH simultaneously with receiving data.

Referring now to FIG. 6, in yet another arrangement according to the invention, the DPCH is again used to convey a single bit indicator (either a 0 or a 1), as in the arrangement illustrated in FIG. 4, but in the arrangement shown in FIG. 6, the bit indicator is transmitted in the TTI preceding the TTI in which the binary indicator is transmitted in FIG. 4. Since the bit indicator cannot indicate which SCCH to decode, all SCCHs must be decoded if there is no simultaneous data (i.e. if the TTI does not also convey at least a portion of a packet). As in the arrangement illustrated in FIG. 4, the same SCCH is used in subsequent consecutive TTIs (until all of the burst is conveyed), and as long as there is simultaneous data in the subsequent TTIs, only a single SCCH must be despread and decoded. As in FIG. 4, there are at least two ways in which the parameter signaling channel being assigned can be communicated to the mobile phone, i.e. either expressly (using e.g. an identifier of the mobile phone on the parameter signaling channel being assigned, or indirectly, using an error detection code, such as a CRC code, to encode the SCCH being assigned that is a code used exclusively by the mobile). As in the arrangement illustrated in FIG. 4, the indication of which channel is being assigned is not provided until the TTI immediately preceding the TTI in which at least a portion of the packet is first conveyed.

In an alternative embodiment, the spreading (and despreading) could be done "interlacedly", i.e. the same despreader would despread one chip from channel 1, then one chip from channel 2, and so on, and the despreading would then start over with the next chip from channel one, and so on.

Scope of the Invention

It is to be understood that the above-described arrangements are only illustrative of the application of the principles of the present invention. In particular, although the invention has been shown and described in the context of a base station communicating a packet to a mobile station, nothing about the invention restricts its use to communication between a base station and a mobile station. The invention is of use in any situation in which a packet-sending entity communicates a packet to a packet-receiving entity where the packet-sending entity is typically simultaneously in communication with several packet-receiving entities, so long as the packet is communicated using a packet communication system including a plurality of parameter signaling channels serving as shared control channels (the channels designated as SCCH in the above description), and also using a plurality of shared data channels (the channels designated as SDCH in the above description), the packet communication system operating according to a protocol in which when packet data is to be transmitted from the packet-sending entity to the packet-receiving entity, the communication between the packet-sending entity and the packet-receiving entity occurs over one or more transmission time intervals. Numerous modifications and alternative arrangements may be devised by those skilled in the art without departing from the spirit and scope of the present invention, and the appended claims are intended to cover such modifications and arrangements.

What is claimed is:

1. A method for operation of a packet-sending entity as part of a packet communication system, the packet communication system including the packet-sending entity and a packet-receiving entity, the packet communication system using a plurality of parameter signaling channels (SCCH), and also using a plurality of shared data channels (SDCH), the packet communication system operating according to a protocol in which when packet data is to be transmitted from the packet-sending entity to the packet-receiving entity, the communication between the packet-sending entity and the packet-receiving entity occurs over one or more transmission time intervals (TTIs), the method comprising:

a) a parameter transmitting step, having the packet-sending entity transmit to the packet-receiving entity at least some of the parameters for decoding some or all of the shared data channels using at least one of the parameter signaling channels;

b) a data providing step, having the packet-sending entity provide to the packet-receiving entity the data to be communicated using at least one of the shared data channels according to the parameters provided on the at least one parameter signaling channel; and c) a further parameter transmitting step, having the packet-sending entity continue to use the same at least one parameter signaling channel to transmit parameters for decoding any additional data transmitted on at least one of the shared data channels for the same packet-receiving entity in the subsequent consecutive TTIs.

2. The method of claim 1, wherein in the parameter transmitting step, the packet-sending entity transmits to the packet-receiving entity within a TTI at least some of the parameters for decoding some or all of the shared data channels within the next TTI.

3. The method of claim 2, wherein in the data providing step, the packet-sending entity provides to the packet-receiving entity in the TTI immediately following the TTI in which the parameter signaling channel is transmitted the data to be communicated using at least one of the shared data channels according to the parameters provided on the at least one parameter signaling channel.

4. The method of claim 3, further comprising, prior to the parameter transmitting step, the steps of:
   a) having the packet-sending entity indicate to the packet-receiving entity that a parameter signaling channel is being assigned to the packet-receiving entity for one or more consecutive TTIs sufficient in number to provide parameters for decoding the shared data channels until there is a cessation in the stream of data constituting the packet intended for the packet-receiving entity; and
   b) having the packet-sending entity assign to the packet-receiving entity a parameter signaling channel.

5. The method of claim 3, further comprising, prior to the further parameter transmitting step, the steps of:
   a) having the packet-sending entity continue to indicate that the same parameter signaling channel is to be used to obtain parameters for decoding the data provided on the shared data channels in the next TTI; and
   b) prior to or in the last TTI in which a portion of the packet is transmitted over the shared data channels, having the packet-sending entity signal to the packet-receiving entity that the parameter signaling channel is no longer assigned to the packet-receiving entity.

6. A method as in claim 4, wherein the packet-sending entity assigns a parameter signaling channel via information conveyed over a dedicated paging channel (DPCH), the information being conveyed in the TTI prior to the first TTI in which at least a portion of the packet is conveyed.

7. A method as in claim 4, wherein the packet-sending entity assigns a parameter signaling channel by indicating over a dedicated paging channel using a binary indicator that the packet-receiving entity is being assigned a parameter signaling channel, the binary indicator being first conveyed in the TTI immediately preceding the first TTI in which at least a portion of the packet is conveyed.

8. A method as in claim 7, wherein, in combination with using a binary bit indicator in the dedicated paging channel, the packet-sending entity uses an error detection code for encoding the assigned parameter signaling channel, an error detection code that is in turn used exclusively by the packet-receiving entity for which the parameter signaling channel is being assigned.

9. A method as in claim 7, wherein, in combination with using a binary bit indicator in the dedicated paging channel, the packet-sending entity conveys an identifier of the packet-receiving entity being assigned a parameter signaling channel on the parameter signaling channel being assigned.

10. A method as in claim 4, wherein in the TTI immediately preceding the TTI in which at least a portion of the packet is first conveyed, the packet-sending entity uses an error detection code for encoding the assigned parameter signaling channel, an error detection code that is in turn used exclusively by the packet-receiving entity for which the parameter signaling channel is being assigned.

11. A method as in claim 4, wherein in the TTI immediately preceding the TTI in which at least a portion of the packet is first conveyed, the packet-sending entity conveys, on the parameter signaling channel being assigned, an identifier of the packet-receiving entity being assigned a parameter signaling channel.

12. A method as in claim 4, wherein the packet-sending entity assigns a parameter signaling channel by indicating over a dedicated paging channel using a binary indicator that the packet-receiving entity is being assigned a parameter signaling channel, the binary indicator being first conveyed in the TTI immediately preceding the TTI immediately preceding the first TTI in which at least a portion of the packet is conveyed.

13. A method as in claim 12, wherein, in the TTI subsequent to the TTI in which the binary bit indicator is conveyed on the dedicated paging channel, the packet-sending entity uses an error detection code for encoding the assigned parameter signaling channel, an error detection code that is in turn used exclusively by the packet-receiving entity for which the parameter signaling channel is being assigned.

14. A method as in claim 12, wherein, in the TTI subsequent to the TTI in which the binary bit indicator is conveyed on the dedicated paging channel, the packet-sending entity conveys, on the parameter signaling channel being assigned, an identifier of the packet-receiving entity being assigned a parameter signaling channel.

15. A method for having a packet-receiving entity receive a packet from a packet-sending entity using a packet communication system including a plurality of parameter signaling channels (SCCH) and a plurality of shared data channels (SDCH), the communication system operating according to a protocol in which, when a packet is to be transmitted from the packet-sending entity to a packet-receiving entity, the packet-sending entity provides an indication that the packet is to be communicated to the packet-receiving entity, the communication between the packet-sending entity and the packet-receiving entity occurring over one or more transmission time intervals, the method comprising the steps of:
   a) until the packet-sending entity assigns a parameter signaling channel to the packet-receiving entity, having the packet-receiving entity despread all the parameter signaling channels and decode a predetermined subset of the parameter signaling channels, wherein the predetermined subset of the parameter signaling channels is either all, one, or none of the parameter signaling channels;
   b) once a parameter signaling channel is first assigned to the packet-receiving entity, having the packet-receiving entity interpret the assignment to be an assignment of a parameter signaling channel for the current TTI, and having the packet-receiving entity despread and decode the assigned parameter signaling channel in the current TTI so as to obtain parameter data from the parameter signaling channel;
   c) having the packet-receiving entity use the parameter data in reading the content of the shared data channels in the subsequent TTI;
   d) having the packet-receiving entity monitor information communicated by the packet-sending entity so as to determine whether the next TTI includes at least a portion of the packet;
   e) in each TTI until the TTI prior to the last TTI in which a portion of the packet is transmitted over the data channels, having the packet-receiving entity despread only the assigned parameter signaling channel and also decode the assigned parameter signaling channel; and
   f) for the last TTI in which a portion of the packet is transmitted over the shared data channels, having the packet-receiving entity despread only the assigned parameter signaling channel and also buffer the assigned parameter signaling channel;
      thereby providing that once a parameter signaling channel is assigned to the packet-receiving entity for communicating a packet, the assigned parameter signaling channel is used by the packet-receiving entity in each subsequent TTI as long as there is at least a portion of the packet in the subsequent TTI, and when there is at least a portion of the packet in the subsequent TTI, for the subsequent TTI the packet-receiving entity despreads and decodes only one parameter signaling channel along with the data channels, and when there is not at least a portion of the packet in the subsequent TTI, for the subsequent TTI the packet-receiving entity despreads all the parameter signaling channels, and decodes either all, one, or none of the parameter signaling channels.

16. A packet-sending entity for operation as part of a packet communication system, the packet communication system including the packet-sending entity and a packet-receiving entity, the packet communication system using a plurality of parameter signaling channels (SCCH), and also using a plurality of shared data channels (SDCH), the packet communication system operating according to a protocol in which when packet data is to be transmitted from the packet-sending entity to the packet-receiving entity, the communication between the packet-sending entity and the packet-receiving entity occurs over one or more transmission time intervals (TTIs), the packet sending-entity comprising:

a) a parameter transmitting means, for having the packet-sending entity transmit to the packet-receiving entity at least some of the parameters for decoding some or all of the shared data channels using at least one of the parameter signaling channels;

b) a data providing means, for having the packet-sending entity provide to the packet-receiving entity the data to be communicated using at least one of the shared data channels according to the parameters provided on the at least one parameter signaling channel; and c) a further parameter transmitting means, for having the packet-sending entity continue to use the same at least one parameter signaling channel to transmit parameters for decoding any additional data transmitted on at least one of the shared data channels for the same packet-receiving entity in the subsequent consecutive TTIs.

17. The packet-sending entity of claim 16, wherein the parameter transmitting means is operable so that the packet-sending entity transmits to the packet-receiving entity within a TTI at least some of the parameters for decoding some or all of the shared data channels within the next TTI.

18. The packet-sending entity of claim 17, wherein the data providing means is operable so that the packet-sending entity provides to the packet-receiving entity in the TTI immediately following the TTI in which the parameter signaling channel is transmitted the data to be communicated using at least one of the shared data channels according to the parameters provided on the at least one parameter signaling channel.

19. The packet-sending entity of claim 18, further comprising:

a) means for having the packet-sending entity indicate to the packet-receiving entity that a parameter signaling channel is being assigned to the packet-receiving entity for one or more consecutive TTIs sufficient in number to provide parameters for decoding the shared data channels until there is a cessation in the stream of data constituting the packet intended for the packet-receiving entity; and b) means for having the packet-sending entity assign to the packet-receiving entity a parameter signaling channel.

20. The packet-sending entity of claim 18, further comprising:

a) means for having the packet-sending entity continue to indicate that the same parameter signaling channel is to be used to obtain parameters for decoding the data provided on the shared data channels in the next TTI; and b) means for having the packet-sending entity signal to the packet-receiving entity that the parameter signaling channel is no longer assigned to the packet-receiving entity, the signaling being provided prior to or in the last TTI in which a portion of the packet is transmitted over the shared data channels.

21. A packet-sending entity as in claim 19, wherein the packet-sending entity assigns a parameter signaling channel via information conveyed over a dedicated paging channel (DPCH), the information being conveyed in the TTI prior to the first TTI in which at least a portion of the packet is conveyed.

22. A packet-sending entity as in claim 19, wherein the packet-sending entity assigns a parameter signaling channel by indicating over a dedicated paging channel using a binary indicator that the packet-receiving entity is being assigned a parameter signaling channel, the binary indicator being first conveyed in the TTI immediately preceding the first TTI in which at least a portion of the packet is conveyed.

23. A packet-sending entity as in claim 22, wherein, in combination with using a binary bit indicator in the dedicated paging channel, the packet-sending entity uses an error detection code for encoding the assigned parameter signaling channel, an error detection code that is in turn used exclusively by the packet-receiving entity for which the parameter signaling channel is being assigned.

24. A packet-sending entity as in claim 22, wherein, in combination with using a binary bit indicator in the dedicated paging channel, the packet-sending entity conveys an identifier of the packet-receiving entity being assigned a parameter signaling channel on the parameter signaling channel being assigned.

25. A packet-sending entity as in claim 19, wherein in the TTI immediately preceding the TTI in which at least a portion of the packet is first conveyed, the packet-sending entity uses an error detection code for encoding the assigned parameter signaling channel, an error detection code that is in turn used exclusively by the packet-receiving entity for which the parameter signaling channel is being assigned.

26. A packet-sending entity as in claim 19, wherein in the TTI immediately preceding the TTI in which at least a portion of the packet is first conveyed, the packet-sending entity conveys, on the parameter signaling channel being assigned, an identifier of the packet-receiving entity being assigned a parameter signaling channel.

27. A packet-sending entity as in claim 19, wherein the packet-sending entity assigns a parameter signaling channel by indicating over a dedicated paging channel using a binary indicator that the packet-receiving entity is being assigned a parameter signaling channel, the binary indicator being first conveyed in the TTI immediately preceding the TTI immediately preceding the first TTI in which at least a portion of the packet is conveyed.

28. A packet-sending entity as in claim 27, wherein, in the TTI subsequent to the TTI in which the binary bit indicator is conveyed on the dedicated paging channel, the packet-sending entity uses an error detection code for encoding the assigned parameter signaling channel, an error detection code that is in turn used exclusively by the packet-receiving entity for which the parameter signaling channel is being assigned.

29. A packet-sending entity as in claim 27, wherein, in the TTI subsequent to the TTI in which the binary bit indicator is conveyed on the dedicated paging channel, the packet-sending entity conveys, on the parameter signaling channel being assigned, an identifier of the packet-receiving entity being assigned a parameter signaling channel.

30. A packet-receiving entity for receiving a packet from a packet-sending entity via a packet communication system including a plurality of parameter signaling channels (SCCH) and a plurality of shared data channels (SDCH), the communication system operating according to a protocol in which, when a packet is to be transmitted from the packet-sending entity to a packet-receiving entity, the packet-sending entity provides an indication that the packet is to be communicated to the packet-receiving entity, the communication between the packet-sending entity and the packet-receiving entity occurring over one or more transmission time intervals, the packet-receiving entity comprising:

a) means for having the packet-receiving entity despread all the parameter signaling channels and decode a predetermined subset of the parameter signaling channels until the packet-sending entity assigns a parameter signaling channel to the packet-receiving entity, wherein the predetermined subset of the parameter signaling channels is either all, one, or none of the parameter signaling channels;

b) means for having the packet-receiving entity interpret an assignment of a parameter signaling channel to be an assignment for the current TTI, and having the packet-receiving entity despread and decode the assigned parameter signaling channel in the current TTI so as to obtain parameter data from the parameter signaling channel;

c) means for having the packet-receiving entity use the parameter data in reading the content of the shared data channels in the subsequent TTI;

d) means for having the packet-receiving entity monitor information communicated by the packet-sending entity so as to determine whether the next TTI includes at least a portion of the packet;

e) means for having the packet-receiving entity despread only the assigned parameter signaling channel and also decode the assigned parameter signaling channel in each TTI until the TTI prior to the last TTI in which a portion of the packet is transmitted over the data channels; and f) means for having the packet-receiving entity despread only the assigned parameter signaling channel and also buffer the assigned parameter signaling channel for the last TTI in which a portion of the packet is transmitted over the shared data channels;

thereby providing a packet-receiving entity in which once a parameter signaling channel is assigned to the packet-receiving entity for communicating a packet, the assigned parameter signaling channel is used by the packet-receiving entity in each subsequent TTI as long as there is at least a portion of the packet in the subsequent TTI, and when there is at least a portion of the packet in the subsequent TTI, for the subsequent TTI the packet-receiving entity despreads and decodes only one parameter signaling channel along with the data channels, and when there is not at least a portion of the packet in the subsequent TTI, for the subsequent TTI the packet-receiving entity despreads all the parameter signaling channels, and decodes either all, one, or none of the parameter signaling channels.

31. A system, comprising:
a) a packet-sending entity, and
b) a packet-receiving entity, for receiving a packet from the packet-sending entity via a packet communication system including a plurality of parameter signaling channels (SCCH) and a plurality of shared data channels (SDCH), the communication system operating according to a protocol in which, when a packet is to be transmitted from the packet-sending entity to a packet-receiving entity, the packet-sending entity provides an indication that the packet is to be communicated to the packet-receiving entity, the communication between the packet-sending entity and the packet-receiving entity occurring over one or more transmission time intervals;

wherein the packet-receiving entity comprises:

a1) a parameter transmitting means, for having the packet-sending entity transmit to the packet-receiving entity at least some of the parameters for decoding some or all of the shared data channels using at least one of the parameter signaling channels;

a2) a data providing means, for having the packet-sending entity provide to the packet-receiving entity the data to be communicated using at least one of the shared data channels according to the parameters provided on the at least one parameter signaling channel; and a3) a further parameter transmitting means, for having the packet-sending entity continue to use the same at least one parameter signaling channel to transmit parameters for decoding any additional data transmitted on at least one of the shared data channels for the same packet-receiving entity in the subsequent consecutive TTIs;

and further wherein the packet-receiving entity comprises:

b1) means for having the packet-receiving entity despread all the parameter signaling channels and decode a predetermined subset of the parameter signaling channels until the packet-sending entity assigns a parameter signaling channel to the packet-receiving entity, wherein the predetermined subset of the parameter signaling channels is either all, one, or none of the parameter signaling channels;

b2) means for having the packet-receiving entity interpret an assignment of a parameter signaling channel to be an assignment for the current TTI, and having the packet-receiving entity despread and decode the assigned parameter signaling channel in the current TTI so as to obtain parameter data from the parameter signaling channel;

b3) means for having the packet-receiving entity use the parameter data in reading the content of the shared data channels in the subsequent TTI;

b4) means for having the packet-receiving entity monitor information communicated by the packet-sending entity so as to determine whether the next TTI includes at least a portion of the packet;

b5) means for having the packet-receiving entity despread only the assigned parameter signaling channel and also decode the assigned parameter signaling channel in each TTI until the TTI prior to the last TTI in which a portion of the packet is transmitted over the data channels; and b6) means for having the packet-receiving entity despread only the assigned parameter signaling channel and also buffer the assigned parameter signaling channel for the last TTI in which a portion of the packet is transmitted over the shared data channels.

* * * * *

UNITED STATES PATENT AND TRADEMARK OFFICE
CERTIFICATE OF CORRECTION

PATENT NO. : 6,697,347 B2
DATED : February 24, 2004
INVENTOR(S) : Kjell Ostman and Esa Malkamäki It is certified that error appears in the above-identified patent and that said Letters Patent is hereby corrected as shown below:

Title page,
Item [57], ABSTRACT,
Line 11, delete "TTT" and substitute -- TTI --.

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,697,347 B2
APPLICATION NO. : 09/935212
DATED : February 24, 2004
INVENTOR(S) : Kjell Ostman et al.

It is certified that error appears in the above-identified patent and that said Letters Patent is hereby corrected as shown below:

Column 16 at line 10 (claim 31), delete "packet-receiving" and substitute --packet-sending-- therefor.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 6,697,347 B2 Page 1 of 1
APPLICATION NO. : 09/935212
DATED : February 24, 2004
INVENTOR(S) : Kjell Östman and Esa Malkamäki It is certified that error appears in the above-identified patent and that said Letters Patent is hereby corrected as shown below:

In column 16, line 29, claim 31, delete "packet-receiving entity" and substitute --packet-sending entity--.

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,697,347 B2 | Page 1 of 1 |
| APPLICATION NO. | : 09/935212 | |
| DATED | : February 24, 2004 | |
| INVENTOR(S) | : Kjell Östman and Esa Malkamäki | |

It is certified that error appears in the above-identified patent and that said Letters Patent is hereby corrected as shown below:

In column 16, line 29, claim 31, delete "packet-receiving entity" and substitute --packet-receiving entity--.

This certificate supersedes Certificate of Correction issued July 17, 2007.

Signed and Sealed this

Twenty-seventh Day of November, 2007

JON W. DUDAS
*Director of the United States Patent and Trademark Office*